(12) United States Patent
Kanter (10) Patent No.: US 10,341,028 B2
(45) Date of Patent: Jul. 2, 2019

(54) SYSTEM AND METHOD FOR MICROWAVE DISTRIBUTION AND MEASUREMENT WITH HIGH DYNAMIC RANGE

(71) Applicant: Gregory S. Kanter, Chicago, IL (US)

(72) Inventor: Gregory S. Kanter, Chicago, IL (US)

(73) Assignee: Nucript LLC, Evanston, IL (US)

( * ) Notice: Subject to any disclaimer, the term of this patent is extended or adjusted under 35 U.S.C. 154(b) by 0 days.

(21) Appl. No.: 15/882,308

(22) Filed: Jan. 29, 2018

(65) Prior Publication Data

US 2018/0219633 A1 Aug. 2, 2018

Related U.S. Application Data

(60) Provisional application No. 62/452,497, filed on Jan. 31, 2017.

(51) Int. Cl.
*H04B 10/2575* (2013.01)
*H04B 10/58* (2013.01)
(Continued)

(52) U.S. Cl.
CPC ......... *H04B 10/58* (2013.01); *H04B 10/2575* (2013.01); *H04B 10/516* (2013.01);
(Continued)

(58) Field of Classification Search
None
See application file for complete search history.

(56) References Cited

U.S. PATENT DOCUMENTS 9,191,112 B2 * 11/2015 Belansky ........... H04B 10/2575
2003/0007205 A1 * 1/2003 Lee ....................... H04B 10/00
398/5
(Continued)

OTHER PUBLICATIONS

Bhatia, Amit, All-Optical Method for Distortion Elimination in Phase-Modulated Microwave Photonic Links, Jan. 27, 2017 (Year: 2017).*

*Primary Examiner* — Kenneth N Vanderpuye
*Assistant Examiner* — Jai M Lee
(74) *Attorney, Agent, or Firm* — Nadya Reingand; Yan Hankin (57) ABSTRACT

A method for transmitting and receiving a radio frequency (RF) signal over an optical channel is described, where a nonlinear optical harmonic generation device is used to increase the system performance. The RF signal is phase modulated onto an optical carrier. The received optical carrier propagates through a nonlinear optical harmonic generation device, which increases a phase modulation depth at the harmonic wavelength. This larger modulation depth can be used to achieve larger gain. By photo-detecting both the fundamental and the harmonic optical wavelengths, then properly scaling and subtracting the two photo-detected signals, the enhanced modulation depth at the harmonic optical wavelength can be used to cancel out unwanted nonlinear distortions thereby linearizing the measured RF signal. The method uses a phase-to-amplitude conversion device to change phase modulation into amplitude modulation, and is compatible with phase-to-amplitude devices that perform photonic down-conversion thereby allowing for reduced bandwidth photo-detectors.

14 Claims, 4 Drawing Sheets

(51) Int. Cl.
*H04B 10/564* (2013.01)
*H04B 10/61* (2013.01)
*H04B 10/516* (2013.01)
*H04B 10/2507* (2013.01)

(52) U.S. Cl.
CPC .......... *H04B 10/564* (2013.01); *H04B 10/61* (2013.01); *H04B 10/2507* (2013.01)

(56) References Cited

U.S. PATENT DOCUMENTS

| | | | | |
|---|---|---|---|---|
| 2003/0095304 | A1* | 5/2003 | Dorring | H04B 10/0795 398/5 |
| 2003/0174386 | A1* | 9/2003 | Oikawa | H04B 10/2543 359/328 |
| 2005/0271394 | A1* | 12/2005 | Whiteaway | H04B 10/25133 398/188 |
| 2006/0133827 | A1* | 6/2006 | Becouarn | H04B 10/677 398/213 |
| 2011/0038642 | A1* | 2/2011 | Mahlab | H04B 10/671 398/211 |
| 2012/0002972 | A1* | 1/2012 | Stiffler | H04B 10/25759 398/115 |
| 2014/0186057 | A1* | 7/2014 | Vacondio | H04B 10/2513 398/202 |
| 2015/0008983 | A1* | 1/2015 | Maniwa | H03F 3/19 330/295 |
| 2015/0104188 | A1* | 4/2015 | Norman | G02B 26/0816 398/142 |
| 2015/0358086 | A1* | 12/2015 | Foster | H04B 10/5561 398/115 |

\* cited by examiner

SYSTEM AND METHOD FOR MICROWAVE DISTRIBUTION AND MEASUREMENT WITH HIGH DYNAMIC RANGE

CROSS-REFERENCE TO RELATED APPLICATIONS

This patent application claims priority to U.S. Provisional patent application No. 62/452,497 filed Jan. 31, 2017.

FIELD OF THE INVENTION

The field of the invention is microwave photonics, including the modulation of photons with radio frequency signals and the use of photonics to aid in distributing and measuring the microwave signal.

BACKGROUND

Photonic technology can be used to enhance the measurement and distribution of microwave signals. This field is sometimes called radio-frequency (RF) or microwave photonics. As an example, antenna remoting is a term that refers to modulating a microwave or RF signal onto an optical signal. The modulated optical signal can then be sent over long distances via a fiber optic cable (an optical channel) which has lower loss, weight, and cost than a high speed RF cable and does not suffer from electro-magnetic interference, to a receiver that converts the signal back into the electrical domain. Ideally very simple equipment is located at the antenna as the antenna location is chosen for optimal reception and often there is little room for additional components near the antenna.

Ideally the microwave signal is exactly reproduced at the receiver with no loss of signal integrity. However, often times the signal integrity is limited by nonlinearities in the optical modulator or the optical demodulator at the receiver. This creates spurious signals whose magnitude depends on the magnitude of the input RF signal, thereby limiting the dynamic range of operation. This effect is sometimes characterized by the spurious free dynamic range (SFDR) metric. Methods to linearize modulators are often complex, and one does not want complex equipment that may be sensitive to drift or parameter settings at the antenna. A method to cancel out the third order nonlinear distortion that uses the natural modulation efficiency (measured by the voltage required to induce a π phase shift in the modulator, or $V_\pi$) difference of an optical modulator between two different optical wavelengths or the difference between two polarization axes of an optical modulator have been demonstrated. While effective in cancelling out nonlinear distortions it turns out such methods also reduce the gain of the systems which in turn reduces the noise figure. The gain reductions of linearized systems can be substantial and are commonly in the (10-20) dB range. This greatly reduces the utility of such linearization methods.

In addition to SFDR, other important system metrics are gain and noise figure (NF). Gain is the ratio between the power of RF signal received to the power of the RF signal applied at the optical modulator. NF is related to the amount of added noise the measurement system produces. If a system has a linear gain of g, the input signal has noise of $n_{in}$, and the measurement/distribution apparatus adds noise added of $n_{add}$, then the noise out of the device can be written as $n_{out}=g \cdot n_{in}+n_{add}$. Using this notation NF=10 log (1+$n_{add}$/g·$n_{in}$). We see that all other things being equal, higher gain also benefits NF. We see now why cancelling out distortions to improve SFDR may cause other problems, specifically reduced gain and increased NF. Gain can be increased, for instance, by increasing the modulation efficiency (reducing the $V_\pi$) of the modulator.

When a typical phase modulator is used then the applied phase shift of the modulator (the signal phase modulation depth) is over some range linearly proportional to the RF signal voltage applied at the modulator ($V_{IN}$). That is $\phi=p \cdot V_{IN}$, where $\phi$ is the instantaneous optical phase shift, and p is a phase modulation efficiency constant where $p=\pi/V_\pi$ and $V_\pi$ is the amount of voltage required to generate a π phase shift in the modulator. Typically gain is proportional to $p^2$, or equivalently $\phi^2$, thus if $V_\pi$ is reduced by a factor of 2 then gain increases by a factor of 4 (6 dB). Increasing p, or equivalently reducing $V_\pi$, increases gain and is thus desirable.

Another method of linearization employs optical nonlinearity in an optical material having third-order nonlinearity (a centrosymmetric material; e.g. a nonlinear optical fiber) has also been demonstrated, but despite the potential power of the technique it required very high optical powers, long lengths of fiber, and tends to add noise. The high required power is due to the low magnitude of the third order nonlinearity and the added noise comes in part from the mixing process between two or more lasers (one laser being the signal and the other being the pump, where the strong pump power helps to generate the desired nonlinear effect), and where the mixing process may be cascaded thereby also cascading the noise.

Another benefit of RF-photonics can be all optical down-conversion, which in principle can replace the electrical mixers more commonly used to down-convert a very high microwave carrier frequency to a lower and more easily detectable carrier frequency. The signal bandwidth of B (in Hz) remains intact, but the carrier frequency about which the signal bandwidth is centered is reduced which makes detection and subsequent processing easier. The more typical solution is to detect the signal at the carrier frequency then down-convert it using an electrical mixer. Electrical mixers add loss, add distortions, and often have less operating frequency range than desired.

What is needed is a system or method to increase the gain of microwave photonic systems. The gain improvement can be used to linearize photonic links without substantially reducing NF. The system should be compatible with implementations that are simple at the transmitter (the initial microwave-to-optical modulator) and with advanced techniques such as all optical down-conversion. These advantages should come with minimal drawbacks.

SUMMARY

We describe a system and method for improving the performance of an RF-photonic link that uses a second order optical nonlinearity to convert an optical signal at a fundamental wavelength λ (center frequency $f_o=\lambda/c$, where c is the speed of light) into an optical signal at a harmonic wavelength λ/N, where N is an integer. An RF signal to be measured is applied to a first phase modulator that imparts the RF signal onto the phase of an optical signal at a fundamental wavelength λ. The phase modulated fundamental optical signal is transmitted to a receiver over an optical channel such as an optical fiber. At the receiver a portion of the received fundamental optical signal is converted into a phase modulated harmonic signal of wavelength of λ/N by a nonlinear optical harmonic generation device (OHGD). The harmonic generation process increases the optical frequency of the fundamental optical signal from an optical carrier at $f_o$ to an optical carrier at $N \cdot f_o$, where N is an integer. The harmonic signal then carries a larger phase modulation depth of $\phi_H = N \cdot p \cdot V_{IN}$, or equivalently a higher phase modulation efficiency of $p_H = N \cdot p$. The phase modulated harmonic optical signal is converted into an amplitude modulated harmonic optical signal using a phase-to-amplitude conversion device. The amplitude modulated harmonic signal is measured using one or more optical-to-electrical (O/E) photodetectors. The higher phase modulation efficiency at the harmonic optical signal leads to an increase in the measured signal gain.

The harmonic generation process could come from second harmonic generation (SHG) where N=2 or third harmonic generation (THG) where N=3 or fourth harmonic generation (as could be realized by two cascaded SHG stages) where N=4, etc. The optical wavelength at the input of the harmonic generation process is of wavelength λ and the process generates an output wavelength at wavelength λ/N. Without loss of generality we will assume the use of SHG where N=2, although other harmonic generation orders like THG is a direct extension of the invention.

The invention method can be used to improve linearity without a large gain penalty (NF penalty) and can be implemented in a practical way. Here the RF signal to be measured is measured both with and without the use of the OHGD. A nonlinear distortion of order q will be much larger with respect to the applied RF signal on the opto-electric (O/E) detected harmonic received RF signal than on the O/E detected fundamental received optical signal. That is, the relative size of the harmonic received RF signal voltage (or equivalently current) and the fundamental received RF signal voltage can be scaled in size by a power control element so that the qth nonlinear distortion of both signals is of identical size. The harmonic and fundamental received RF signals can then be subtracted in a subtraction block, which will allow for the qth nonlinear distortion to be subtracted out while the desired RF signal has only a small reduction in gain.

The signal power control element can be realized in many ways such as an optical variable attenuator, an electrical variable attenuator, or an electrical variable gain element. If the O/E signals are detected using analog-to-digital converters (ADCs) the signal power control element as well as the subtraction block can be realized via digital signal processing. The subtraction block can also be realized for instance by directly subtracting currents from photo-detectors or by using an electrical hybrid combiner.

The qth nonlinear distortion terms will cancel out when the two appropriately scaled detected signals are subtracted in a subtraction block. After subtraction the linearized received RF signal will not contain the qth nonlinear distortion term, and the voltage of the desired RF signal will be reduced by only a small amount. After appropriate scaling, the voltage of the harmonic received RF signal will be smaller than the voltage of the fundamental received RF signal by a factor of $(N/N^q) = N^{(q-1)}$, thus the subtraction only modestly reduces the size of the linearized received RF signal to a voltage smaller by a factor of $1 - (1/N^{(q-1)})$. For the case of SHG (N=2) and third order nonlinear distortions (q=3) the linearized signal power is reduced by $10 \cdot \log(1 - 2^{-2})^2$, or $-2.5$ dB. The relatively small gain penalty is accompanied by a greater dynamic range (linearity) as can be quantified by the SFDR.

SHG can be much more efficient than the third order nonlinearity found in optical fiber. It can also be realized in common technology platforms such as Lithium Niobate (LN) or Gallium Arsenide (GaAs), for instance by the use of phase matching via periodic poling. These technology platforms can also realize optical modulators. Thus there is the potential for the both the modulation and the nonlinearity capabilities to be realized in an integrated photonic optical circuit.

The effective modulation efficiency after a fundamental wavelength is phase modulated in a phase modulator then the resulting optical signal is frequency doubled in an SHG stage is a factor of 2 higher than the modulation efficiency at the fundamental wavelength (equivalent to a 50% decrease in $V_\pi$ at the harmonic wavelength). This large and predictable difference in $V_\pi$ allows for efficient linearization without a large penalty in gain or noise figure. By using a phase modulator at the transmitter, where the RF signal is imparted to the optical signal, the optical power into the SHG stage is not varying (it is phase modulated but not intensity modulated) and therefore the SHG conversion efficiency is constant.

Because there is only one input wavelength to the nonlinear stage there are few noise mechanisms and enhanced simplicity. The invention does not require a large amount of the fundamental input wavelength power to the SHG stage to be converted to the harmonic wavelength, or stated another way it does not require very high SHG conversion efficiency. This characteristic keeps the power at the harmonic wavelength lower which is beneficial for power efficiency and mitigating deleterious effects like photorefractive effects in the SHG stage or modulators. Additionally the fundamental wavelength can be chosen to be a wavelength most compatible with fiber optical transmission, such as a 1310 nm or 1550 nm wavelength, and since the SHG would most often occur at the receiver, where the modulated optical signal is converted into an electrical signal, the harmonic wavelength does not need to propagate through long lengths of fiber.

When N=2 we find that the required photo-detected current in the harmonic arm to cancel out third order distortion (q=3) is just $(1/N^3)$ or 12.5% of the photo-detected current in the fundamental arm, assuming no additional amplification or attenuation in either the fundamental or harmonic O/E detected signals. This means that only a small amount (e.g. ~11% if the fundamental and harmonic photo-detectors have equal responsivity) of the input fundamental power needs to be converted into SHG, which makes it easier in practice to achieve the required conversion efficiency and maintain low powers suitable for avoiding photorefractive effects. An optical amplifier can be placed before the OHGD to increase the optical power entering the OHGD and thus increase the harmonic optical power levels. Additionally, electrical amplification can be placed after the O/E detected harmonic signal in order to reduce the required harmonic signal out of the OHGD.

If THG (N=3) is used then <4% conversion to the third harmonic is required, which is useful since THG is typically not a very efficient process and thus requiring high THG efficiency would likely be impractical.

The invention will use a second order nonlinearity (which is orders of magnitude stronger than the third order nonlinearity in fiber) that can directly and efficiently be attained in LN. We will assume without loss of generality that SHG is the nonlinearity employed, though other harmonics like THG could be substituted as would be apparent to someone skilled in the art. SHG only requires a single input wavelength and thus noise mechanisms due to wavelength mixing. By using SHG the phase shift of the output second harmonic (SH) wavelength electric field (E) is multiplied by 2, that is $E_{2\omega} \propto (|E_\omega|e^{i\phi})^2$, where $\phi$ is the phase shift on the fundamental frequency $\omega$. We could use SHG after the first phase modulator to effectively reduce $V_\pi$ by 2 and improve gain by 6 dB. However, in photonic links we also want a high optical power hitting the detectors (e.g. typically on the order or greater than 10 mW) to reduce the impact of shot noise. Due to the efficiency of the SHG process and technical difficulties like photorefractive effects such an implementation may be more difficult to achieve with current technology. However, since for linearization purposes only a relatively small amount of SHG signal power is required the use of SHG to improve the linearity of photonic links becomes more practical.

The invention is compatible with designs that achieve photonic down-conversion (PDC). Here the RF carrier frequency $f_{RF}$ about which the RF signal bandwidth B is centered is actually detected at the O/E detectors at a reduced carrier frequency $f_{PDC}$, where $f_{RF} > f_{PDC} > B/2$. The reduced carrier frequency at the O/E detectors is beneficial to allow for reduced detector bandwidth. PDC can be achieved by driving a down-conversion phase modulator at the receiver with a local oscillator (LO) of frequency $f_{LO}$, then using suitable optical filtering as is known in the art. For OHGD-linearized systems that photonically down-convert both the fundamental and the harmonic wavelengths, a separate down-conversion phase modulator can be used at each wavelength.

One type of phase-to-amplitude conversion device is an interferometer with asymmetric delay of $\tau$, where $\tau \approx 0.5/f_{RF}$. This type of detection does not perform PDC, but typically there are two complementary outputs of the interferometer allowing for balanced detection to subtract out relative intensity noise (RIN) on the optical signal using balanced optical detection. Balanced detection can be used at the fundamental wavelength O/E detectors, the harmonic O/E detectors, or in linearized systems at both the fundamental and harmonic O/E detectors.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not to other embodiments. In general, features described in one embodiment might be suitable for use in other embodiments as would be apparent to those skilled in the art.

Figure 1:
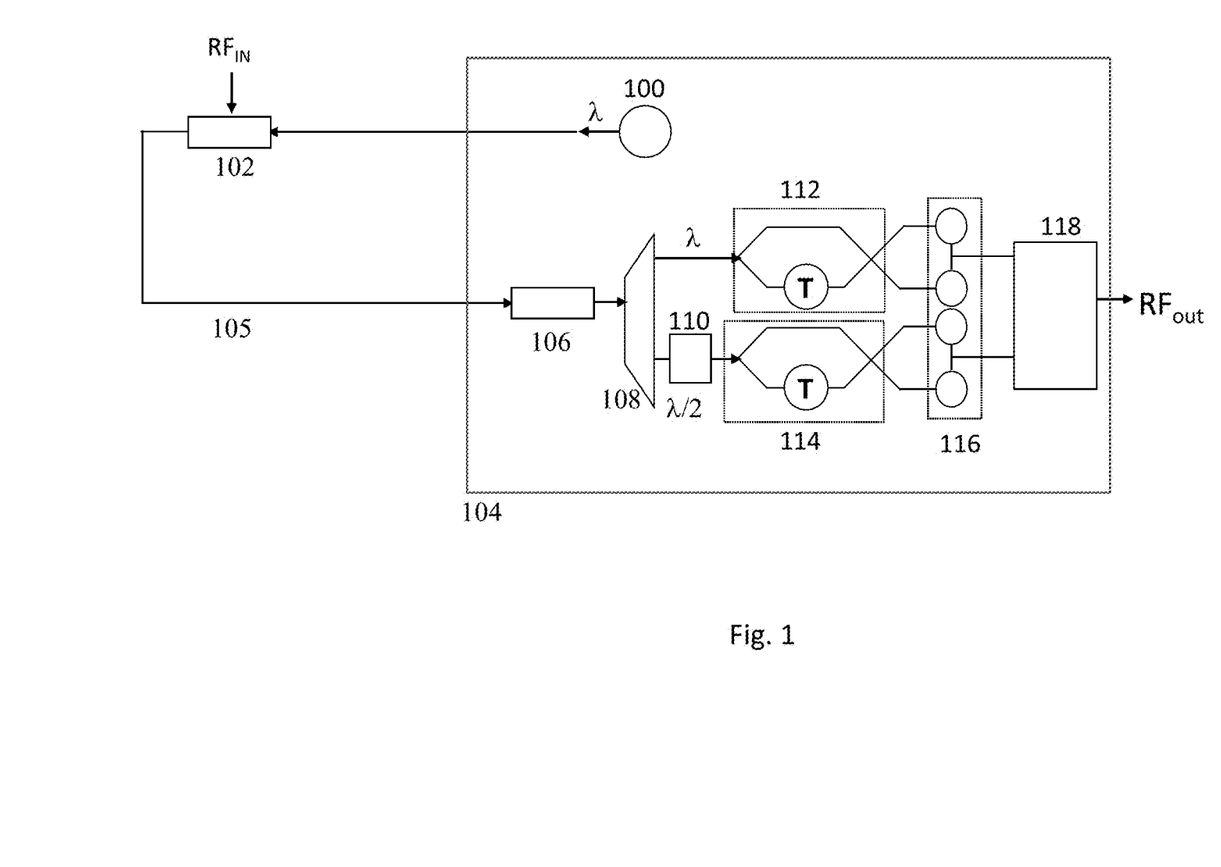
FIG. 1 One embodiment of the invention that uses phase-to-amplitude converters on both the fundamental and harmonic signals.

An embodiment of the invention is shown in FIG. 1. The system modulates an optical signal produced by a laser 100 operating at a fundamental wavelength $\lambda$ according to an input RF signal ($RF_{IN}$) via an optical phase modulator 102. The optical phase modulator can also be called the optical transmitter. The modulator in this embodiment is a phase modulator, which thus maintains a constant optical output power exiting the modulator. The modulated optical signal carries a phase shift of $\phi = p \cdot V_{IN}$, where p is a phase modulation constant and $V_{IN}$ is the voltage to the optical modulator. The phase modulated optical output is sent to a receiver 104 over an optical fiber cable (105). The optical receiver has a SHG stage 106 which can be realized in periodically poled Lithium Niobate. The SHG stage converts a percentage of the input optical signal into the harmonic optical signal (the harmonic is at a wavelength of $\lambda/2$). The fundamental and harmonic signals are split into two output arms by a wavelength division multiplexer (WDM) (108). The harmonic optical signal carries a phase shift of $\phi H = 2 \cdot p \cdot V_{IN}$, and thus has a larger optical phase modulation than the signal at the fundamental wavelength by a factor of N=2.

The percentage of input fundamental power converted to the second harmonic (SH) is dependent on the optical power input to the SHG stage and the conversion efficiency of the SHG stage, which can be specified as the small signal conversion efficiency $\eta$ in units of %/W. For instance, assume a lossless 600%/W SHG stage and a 20 mW input fundamental signal. This leads to a $(6 \cdot 0.02) \cdot 20$ mW=2.4 mW output harmonic power and a (20−2.4)=17.6 mW output fundamental power. One or more output arms of the WDM can contain a signal power control device (SPCD) (110). In this embodiment the SPCD is assumed to be realized as a variable optical attenuator (VOA) on the harmonic arm. The SPCD is set so that eventually after the photo-detected fundamental and harmonic signals are subtracted the measured RF output signal is linearized since an undesired nonlinear term is eliminated.

Assume we want a particular ratio R between the opto-electric (O/E) detected harmonic and fundamental signals just before subtraction. Thus R also sets the desired harmonic and fundamental optical power ratio at the output of the SHG device, with the understanding that this optical power ratio will depend on many factors including the responsivity of the respective optical-to-electrical detectors, the SPCD is used to set R accordingly in such a way as to reduce the system nonlinear distortion. This ratio may in practice be determined by monitoring the quality of the microwave output signal and feeding back a control signal to the SPCD. We may set $R = 1/N^q$ since the relative size of the voltage of the nonlinear distortion of order q is enhanced by a factor of $N^q$. Since the relative size of the desired signal is enhanced by a factor of N by the OHGD, we see that the signal size at the fundamental and harmonic are now in the ratio $1:N/N^q$ or the harmonic-derived signal is reduced by a factor of $(1/N^{(q-1)})$. In order to cancel out the third order intermodulation tone (q=3), we find R=12.5% but in this example we have R=2.4/17.6=13.6%. Thus we can use the SPCD to attenuate the harmonic signal to 2.2 mW so that R=2.2/17.6=12.5%.

The SPCD could instead be located on the fundamental arm, and it could also be an amplifier instead of an attenuator. If more harmonic signal than is required is generated in the SHG stage then the attenuator can be placed in the SHG arm, as shown in FIG. 1. It is alternatively useful to use an electrical amplifier as the SPCD in the harmonic arm as that reduces the required conversion efficiency of the fundamental-to-harmonic in the SHG stage (reduces the required harmonic optical power). However, if the VOA configuration shown in FIG. 1 provides sufficient SHG conversion then it consumes less power and adds less noise than the use of an active amplifier. It is also possible to apply the SPCD in the electrical domain, such as by putting an electrical variable attenuator or electrical variable gain amplifier after the optical signals have been converted to electrical signals. It is also possible to put the VOA before the SHG stage and change the net amount of SH generated by changing the optical input power to the SHG stage.

The harmonic and fundamental signals each pass through phase-to-amplitude conversion devices 112 and 114, which are realized via asymmetric Mach-Zehnder Interferometers (AMZIs). The AMZIs have a relative time delay between their two arms of $\tau$, where $\tau$ is typically chosen so that the RF carrier frequency $f_{RF}$ is $\sim 0.5/\tau$ in order to make the phase-to-amplitude conversion process optimally efficient. Other types of phase-to-amplitude conversion devices could be used as well, including local-oscillator modulated phase modulators followed by appropriate optical filters or coherent detection techniques.

The optical outputs from the fundamental and harmonic wavelength AMZIs are now amplitude modulated and are converted to modulated electrical signals using optical-to-electrical (O/E) detectors 116 which translate the amplitude modulated signal from the optical to the electrical domain. Note that the phase-to-amplitude conversion devices are located after the SHG stage so that the optical intensity into the SHG stage is not varying. The fundamental and harmonic AMZIs each have two output ports, both of which are out-of-phase and can be detected in balanced O/E detectors as is known in the art. The balanced O/E detectors are used to reduce relative intensity noise (RIN) on the optical signal. Balanced detection can be implemented by detecting both ports in separate O/E detectors and subtracting the currents from both detectors.

The resulting electrically detected harmonic and fundamental signals are processed in a subtraction block realized by an electrical hybrid 118 that subtracts the detected signals from the fundamental and harmonic O/E detectors to create the linearized received RF signal ($RF_{out}$). The linearized received RF signal has strong cancellation of a given nonlinear distortion, typically the dominant nonlinear distortion which we assume to be the third order intermodulation distortion (IM3). The desired RF signal is only modestly affected by the subtraction process. Other means of subtraction including direct current subtraction of the fundamental and harmonic photodetectors is also possible. By setting the SPCD appropriately the nonlinearity inherent in the system can be canceled, at least to a certain order which we will henceforth without loss of generality assume is the third order nonlinearity (q=3). The third order nonlinearity will mix two RF input signals at frequencies of $f_o+\Delta_1$ and $f_o+\Delta_2$ to create unwanted terms at frequencies $f_o+2\cdot\Delta_1-\Delta_2$ and $f_o+2\cdot\Delta_2-\Delta_1$.

We note that FIG. 1 also can represent a high-gain design instead of a linearized design by simply ignoring the fundamental wavelength following the WDM and removing the subtraction block. In this case the O/E detected received harmonic signal is the RF output, and the SHG stage acts to increase the gain of the system by as much as 6 dB ($N^2$). The actual gain is also dependent on other factors such as received optical power and O/E detector responsivity, but assuming the same average current is available out of the O/E detectors then a 6 dB gain improvement is realizable. Such a design does not improve linearity but can improve NF due to the gain enhancement.

Figure 2:
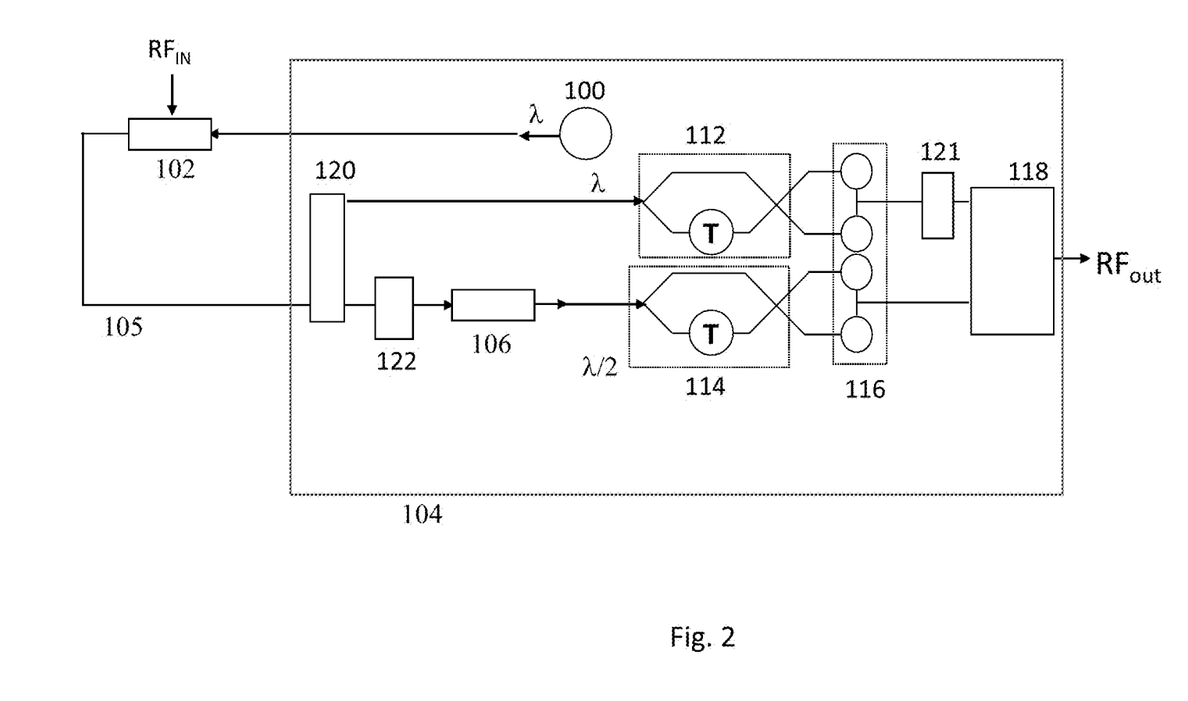
FIG. 2 Similar to FIG. 1 but the balancing between the RF signal from the fundamental and harmonic wavelengths to achieve linearization is achieved at least in part from a power control device such as a variable attenuator in the electrical domain.

Instead of realizing the SPCD in the optical domain the power adjustment for optimal linearity (cancellation of nonlinear distortion terms) can be made in the electrical domain by placing the SPCD after the O/E detectors as depicted in FIG. 2, which is similar to FIG. 1 and thus uses a similar numbering scheme, but now the SPCD is an electrical attenuator 121 used to match the signal size of the RF signals at the hybrid combiner that are generated by the fundamental and harmonic optical signals.

FIG. 2 also has an optical splitter 120 before the SHG stage which splits the signal into two arms. One arm passes through the fundamental wavelength AMZI 112 as before and the size of the detected electrical signal derived from the fundamental wavelength can be changed in the SPCD via the electrical attenuator 121. The other arm is first amplified in an optical amplifier 122, which can also serve as an SPCD if its gain is variable. The harmonic signal out of the SHG stage then passes through the harmonic AMZI 114, and is detected as usual. This design does not require the WDM and gives more control options in terms of balancing the fundamental and harmonic signals. For instance, changing the laser power can be used to control the size of the fundamental signal with respect to the harmonic signal, since in the small signal conversion regime a 1 dB change in the fundamental optical signal power will result in a 2 dB change in the harmonic optical signal power. The use of an electrical based SPCD allows independent control over the received fundamental and harmonic optical powers and the ratio (R) of the electrical signals at the subtraction block. For instance the optical powers can be set as high as possible to allow for operation with the best possible signal-to-noise ratio but not so high as to experience unacceptable amounts of nonlinearity due to excessive optical power hitting the optical-to-electronic detectors, while the electrical attenuator 121 is then used to set R in order to cancel the unwanted nonlinear distortion.

The balancing of the electrical signals derived from the detected fundamental and harmonic signals can also be done via digital signal processing (DSP) if the fundamental and harmonic electrical signals out of their respective O/E detectors are measured using separate analog-to-digital conversion (ADC) channels. Such a configuration will be discussed later in the context of optical down-conversion systems since after down-conversion it will be easier to employ ADCs to directly measure the resulting signal because the carrier modulation frequency out of the O/E detectors is lower.

Figure 3:
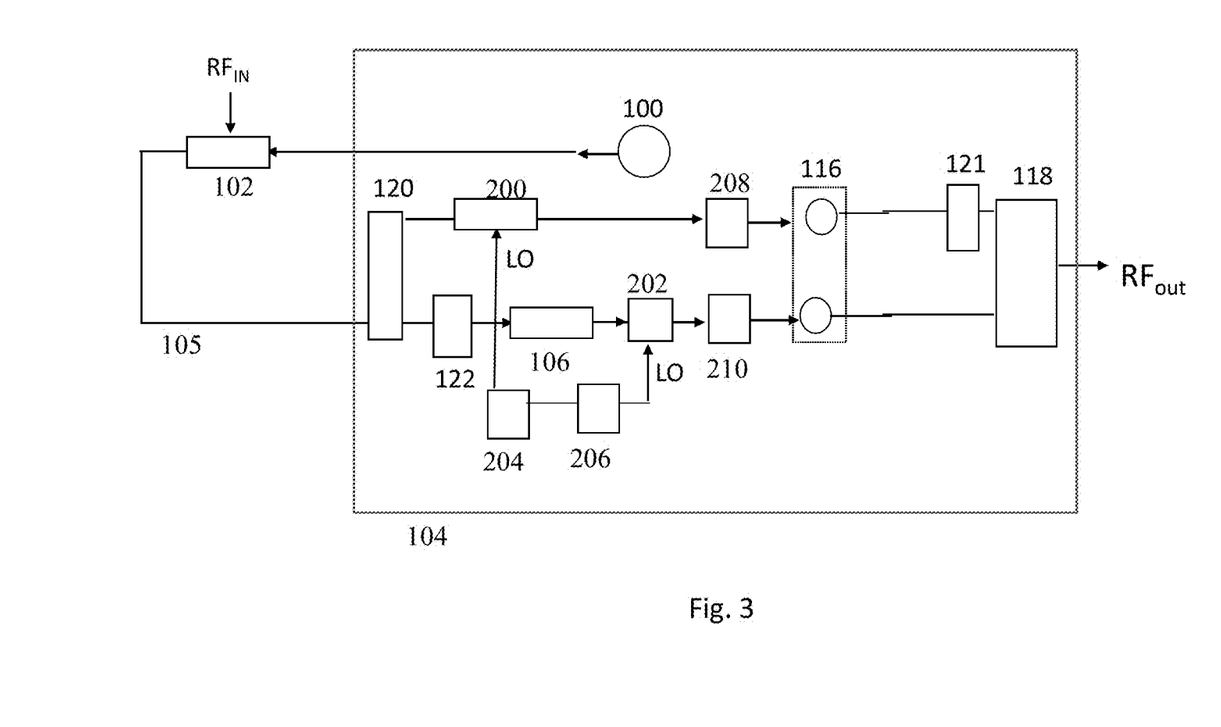
FIG. 3 Embodiment that also preforms optical downconversion.

Another embodiment is shown in FIG. 3 where now optical down-conversion is employed. Parts with the same functionality as FIG. 2 are labeled with the same part numbers. The AMZIs are replaced by down-converting phase modulators at the fundamental 200 and harmonic 202 wavelength. The down-converting phase modulators are driven by a local oscillator (LO) created by a LO signal generator 204 at a frequency $f_{LO}$. The LO frequency will eventually lead to the down-conversion of the detected RF signal from $f_{RF}$ to $f_{PDC}=f_{RF}\pm f_{LO}$ (where + or − is chosen so as to keep $f_{PDC}<f_{RF}$), as is known in the art. Here the RF carrier frequency $f_{RF}$ about which the RF signal bandwidth B is actually detected at the O/E detectors at a reduced carrier frequency $f_{PDC}$, where $f_{RF}>f_{PDC}>B/2$. The reduced carrier frequency at the O/E detectors is beneficial to allow for reduced detector bandwidth. The $f_{PDC}$ must be at least ½ of B in order to capture all the desired bandwidth.

A variable delay line 206 is used to match the delay of the fundamental and harmonic arms. Matching the delay ensures that the fundamental and harmonic signals are of appropriate phase at the electrical hybrid so that they subtract (e.g. in-phase if the electrical hybrid is a 180° style hybrid). In prior figures the variable delay line was not present as it was assumed that the path lengths were already matched.

The down-converting phase modulators are followed by optical filters at the fundamental 208 and harmonic 210 wavelengths before being detected in a system of O/E detectors 116. The optical filters can be fiber Bragg gratings that remove the carrier frequency at both the fundamental and harmonic wavelengths. The electrical signals generated by the fundamental and harmonic wavelengths are adjusted in size using an SPCD realized by an electrical attenuator 121, then subtracted in an electrical hybrid 118.

Figure 4:
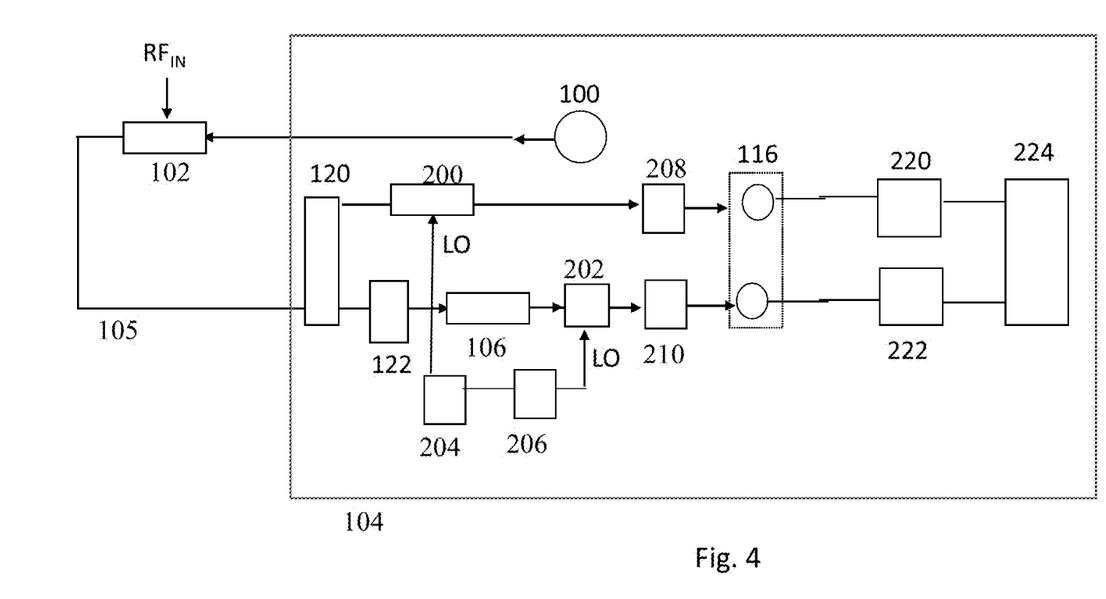
FIG. 4 Similar to FIG. 3 but the balance between the RF signal from the fundamental and harmonic wavelengths to achieve linearization is performed in a digital signal processor.

FIG. 4 shows a configuration similar to FIG. 3, but now the balancing of the microwave powers from the RF signal derived from the fundamental and the RF signal derived from the harmonic is achieved in the digital domain. Each O/E detector output is digitized by an analog-to-digital-converter (ADC) 220, 222, and the digitized signals are sent to a digital signal processor (DSP) 224. The DSP scales and subtracts the two ADC signals digitally so as to obtain a linearized received RF signal. This method is facilitated by the optical down-conversion process which reduces the carrier frequency as seen by the ADCs so that lower speed, higher resolution ADCs are capable of the digitization. For instance, if the RF input signal is a 40 GHz carrier modulated at 500 MHz and the LO is set to 1.1 GHz then the carrier frequency at the ADCs is 1.1 GHz-500 MHz or 600 MHz. This can in principle be measured by a relatively low speed 1.2 Gigasample/s ADC, but directly measuring the signals modulated on a 40 GHz with an ADC is substantially more difficult.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks. Other variations and embodiments are possible in light of above teachings, and it is thus intended that the scope of invention not be limited by this.

What is claimed is:

1. An apparatus for measuring an input radio frequency (RF) electromagnetic signal, comprising:
   a first phase modulator that imparts the RF signal onto a fundamental optical signal thus creating a phase modulated optical signal wherein a size of a phase modulation depth is related to a voltage (V) of the input RF signal by a phase modulation constant p so that an applied phase shift is p·V;
   an optical channel connecting the phase modulated optical signal to a receiver, wherein the receiver includes a nonlinear optical harmonic generation device (OHGD), the OHGD generating a phase modulated harmonic optical signal by multiplying an optical frequency $f_o$ of the fundamental optical signal at an OHGD input to a higher optical frequency N·$f_o$ at an OHGD output where N is an integer;
   a first phase-to-amplitude conversion device that converts the phase modulated harmonic optical signal into an amplitude modulated harmonic optical signal; the amplitude modulated harmonic optical signal being detected in a first set of one or more optical-to-electrical (O/E) detectors generating a harmonic received RF signal; wherein the OHGD acts to increase the size of the phase modulation depth of the phase modulated harmonic optical signal to N·p·V so as to increase a gain between the RF input signal and the harmonic received RF signal.

2. The apparatus of claim 1 wherein the OHGD is a second harmonic generation stage with N=2.

3. The apparatus of claim 1, wherein a portion of the phase modulated optical signal is connected to a second phase-to-amplitude conversion device; an optical signal exiting the second phase-to-amplitude conversion device being detected in a second set of one or more O/E detectors forming a fundamental received RF signal; the harmonic received RF signal and the fundamental received RF signal subsequently being sent to a subtraction block to create a linearized received RF signal; wherein the linearized received RF signal has an improved dynamic range with respect to the fundamental received RF signal.

4. The apparatus of claim 1, wherein the RF electromagnetic signal has a carrier frequency $f_{RF}$ and a signal bandwidth of a spectral width equal to B wherein B<$f_{RF}$, the first phase-to-amplitude conversion device is a photonic down-conversion system comprised of a second phase modulator driven by an RF local oscillator (LO), and an optical filter following the second phase modulator; wherein the photonic down-conversion system acts to generate a detected carrier frequency at the harmonic of $f_{RF,H}$ wherein B/2<$f_{RF,H}$<$f_{RF}$, and whereas the detected carrier frequency reduces a required bandwidth of the O/E detector of the first set but does not impact a reception of the RF signal bandwidth.

5. The apparatus of claim 1, wherein the first phase-to-amplitude conversion device is an interferometer with an asymmetric delay $\tau_{delay}$, wherein an RF input frequency of $f_{RF}$ is efficiently converted into an amplitude modulated harmonic optical signal modulated at a frequency of $f_{RF}$ by setting $\tau_{delay}\approx(0.5/f_{RF})$.

6. The apparatus of claim 3, wherein a relative size of the fundamental received RF signal and the harmonic received RF signal is controlled by a signal power control element so as to set their relative size before the subtraction block in order to achieve optimal cancellation of unwanted nonlinear mixing terms that otherwise limit a dynamic range.

7. The apparatus of claim 6, wherein the signal power control element is an optical attenuator.

8. The apparatus of claim 6, wherein the fundamental RF received signal and the harmonic RF received signal are both digitized by analog-to-digital converters (ADCs), the ADCs being connected to a digital signal processor (DSP), and the signal power control element and the subtraction block are implemented by a processing in the DSP.

9. The apparatus of claim 1, wherein an optical amplifier is located before the OHGD to increase an optical power entering the OHGD and thus in turn increase an optical power of the phase modulated harmonic optical signal.

10. The apparatus of claim 6, wherein the fundamental received RF signal and the harmonic RF received signals are both electrical currents and the subtraction block is realized by directly connecting their electrical currents.

11. The apparatus of claim 3, wherein the harmonic received RF signal is amplified in an electrical amplifier before the subtraction block, the electrical amplifier reducing a required size of the optical signal input to the OHGD that leads to linearizing the received RF signal.

12. The apparatus of claim 3, wherein the first and second phase-to-amplitude conversion devices are interferometers each having an asymmetric delay $\tau_{delay}$, wherein an RF input frequency of $f_{RF}$ is efficiently converted into the linearized received RF signal at a frequency $f_{RF}$ by setting $\tau_{delay} \approx (0.5/f_{RF})$.

13. The apparatus of claim 12, wherein the second phase-to-amplitude conversion device has two complimentary output ports, each port being detected in a balanced O/E detector to generate the balanced fundamental RF received signal to help subtract out optical intensity noise from the fundamental optical signal.

14. The apparatus of claim 12, wherein the first phase-to-amplitude conversion device has two complimentary output ports, each port being detected in a balanced O/E detector to generate the balanced harmonic RF received signal to help subtract out optical intensity noise in the harmonic optical signal.

* * * * *